United States Patent [19]

Anspach, Jr. et al.

[11] Patent Number: 5,496,219

[45] Date of Patent: Mar. 5, 1996

[54] UNIVERSAL JOINT WITH DUAL ROLLERS

[75] Inventors: William E. Anspach, Jr., Palm Beach Gardens; Eddy H. del Rio, Royal Palm Beach, both of Fla.

[73] Assignee: The Anspach Effort, Inc., Palm Beach Gardens, Fla.

[21] Appl. No.: 146,295

[22] Filed: Oct. 19, 1993

[51] Int. Cl.$^6$ ..................................................... F16D 3/16
[52] U.S. Cl. .......................................... 464/119; 464/147
[58] Field of Search .................................... 464/112, 119, 464/147

[56] References Cited

U.S. PATENT DOCUMENTS

| | | | |
|---|---|---|---|
| 1,397,951 | 11/1921 | Fischer | 464/112 |
| 3,212,290 | 10/1965 | Walden | 464/112 |
| 4,065,941 | 1/1978 | Aoki | 464/119 |
| 4,114,403 | 9/1978 | Grey | 464/147 |
| 4,968,173 | 11/1990 | Fujita | 464/112 |
| 5,288,271 | 2/1994 | Nelson et al. | 464/147 |

Primary Examiner—Daniel P. Stodola
Assistant Examiner—Eileen A. Dunn
Attorney, Agent, or Firm—Quarles & Brady

[57] ABSTRACT

A device for connecting two non-coaxial rotating shafts comprises a first body connected to one shaft and a second body connected to the other shaft. A link extends between the two bodies. A first coupling mechanism connects the first body to the link and includes a first pair of conical rollers rotatably attached to either the first body or the link. The first coupling mechanism also includes first tapered aperture through the other one of the first body and the link with the first pair of rollers located in the first tapered aperture. A second coupling mechanism connects the second body to the link and includes a second pair of conical rollers rotatably attached to either the second body or the link. The other one of the second body and the link has a second tapered aperture in which the second pair of rollers is located.

11 Claims, 2 Drawing Sheets

UNIVERSAL JOINT WITH DUAL ROLLERS

BACKGROUND OF THE INVENTION

The present invention relates to universal joints.

Rotating shafts are commonly used to transmit mechanical energy between different components of a machine. In many instances, either the points at which the shaft is coupled to the components cannot be accurately aligned or those two points move with respect to one another during operation of the machine. In such circumstances, it is commonplace to attach separate shafts to the two components and connect the two shafts together using a universal joint which is capable of transmitting the rotation from one shaft to the other when the shafts are not coaxial.

A typical universal joint has a pair of U-shaped members with their midpoints attached to the end of a different one of the shafts. The open ends of the two U-shaped members are positioned in a facing manner, but rotated at ninety degrees with respect to each other. A cross member is formed by two rods connected at their midpoints and each rod extends between the legs of a different U-shaped member.

One of the drawbacks of this type of joint is the loss in efficiency as the angle between the axes of the two shafts increases. This inefficiency is typified by the output shaft's velocity varying with the angle of rotation. Such velocity variation produces vibration which is of particular concern at higher rotational speeds.

Therefore, it is desirable to be able to couple two non-coaxial shafts in a manner which provides a constant or near constant velocity in the output shaft. This desired function can be expressed as producing a unity ratio of the angular velocity of the two shafts.

SUMMARY OF THE INVENTION

The object of the present invention is to provide a universal joint for coupling two rotating members in a manner that minimizes the difference in rotational velocity between the members as they rotate through 360 degrees.

A universal joint according to the present invention has a first body connected to one rotating member and a second body connected to the other rotating member. A link is employed to transfer rotational forces between the two bodies.

A first coupling mechanism connects the first body to the link and includes a first pair of rollers rotatably mounted on a pin that is attached to either the first body or the link. The rollers have conical surfaces and preferably are mounted on the pin with their small diameter ends abutting each other. The first coupling mechanism also includes a first aperture through the other one of the first body and the link with the first pair of rollers located in the first aperture. The cross sectional area of the first aperture decreases a relative large opening at the surface of the first body or the link to an intermediate portion having a smaller cross section area.

A second coupling mechanism connects the second body to the link and includes a second pair of rollers rotatably mounted on another pin that is attached to either the second body or the link. The second pair of rollers both have conical surfaces and preferably are mounted on the other pin with their small diameter ends abutting each other. The other one of the second body and the link has a second aperture in which the second pair of rollers is located.

This universal joint structure allows movement in two orthogonal axes about each pair of rollers. That freedom of movement reduces the variation in angular velocity between the link and the respective coupling as they rotate through 360 degrees.

DETAILED DESCRIPTION OF THE INVENTION

Figure 1:
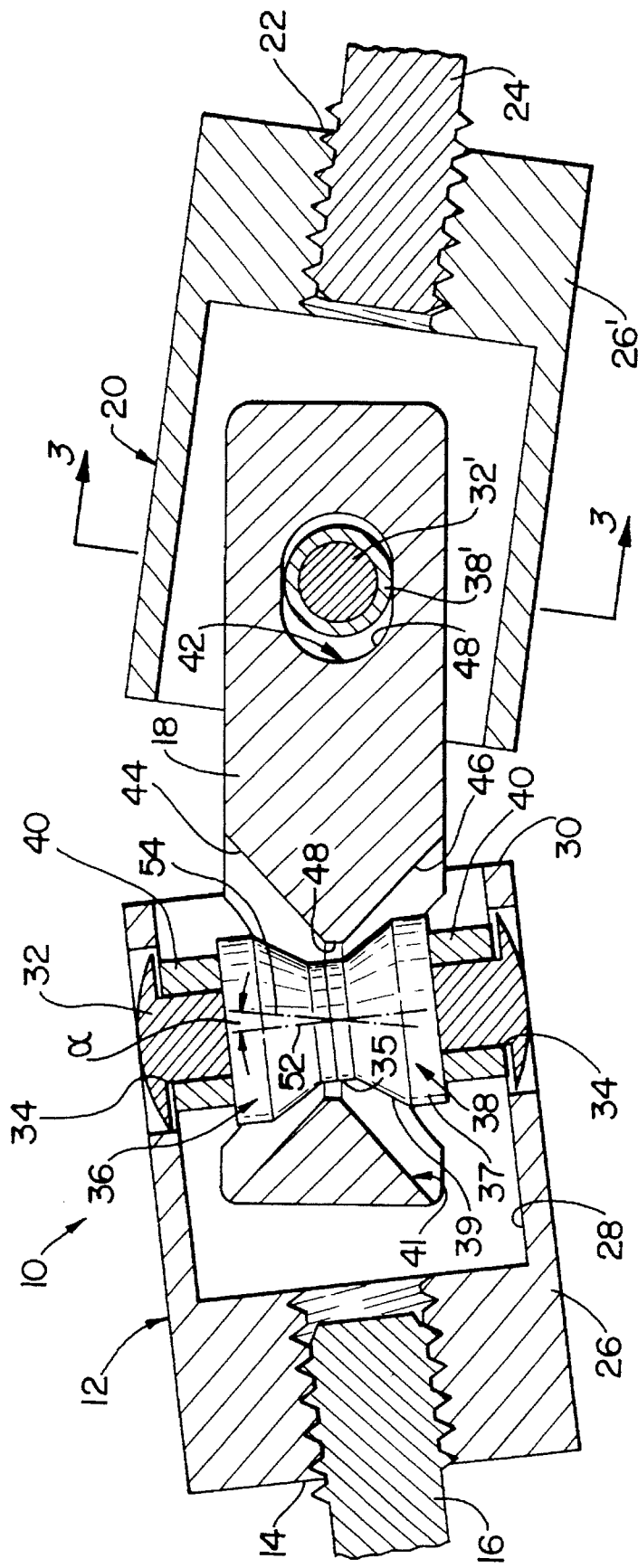
FIG. 1 is a longitudinal cross-sectional view of a universal joint according to the present invention.

With reference to FIG. 1, a universal joint 10 according to the present invention has an input coupling 12 with a central first threaded aperture in one end 14 which receives the threaded end of a first shaft 16. In this example, the first shaft 16 is driven rotationally by another device (not shown). The first coupling 12 is connected by a link 18 to an output coupling 20 having a central second threaded aperture 22 in one end which receives the threaded end of a second shaft 24. As will be described, when the first shaft 16 is rotated, the universal joint 10 conveys that rotational movement to the output shaft 24 even though the axes of the two shafts 16 and 24 are not co-linear.

The input coupling 12 has a cylindrical body 26 with a cylindrical cavity 28 extending into the body from another end 30 which is remote from the first shaft 16. A pin 32 extends across the cavity 28 and through holes 34 in the walls of the cylindrical body 26 which form the cavity. The ends of pin 32 are rounded over thereby holding the pin in place in the cylindrical body 26. Two rollers 36 and 38 have central apertures through which the pin 32 passes in a manner that allows the rollers to spin on the pin. The rollers 36 and 38 abut each another and are centrally positioned along the pin within the cavity 28 by sleeves 40.

Each roller 36, and 38 has a smaller diameter round portion 35 at one end and a larger diameter portion 37 at the other end. The two portions 35 and 37 are connected by a tapered middle section 39 which forms a conical surface of each roller. When the rollers are placed onto pin 32, the smaller diameter portions 35 abut one another, forming a spool-like roller combination.

Referring still to FIG. 1, the output coupling 20 has a structure which is identical to that the input coupling 12 and similar components of the output coupling are designated with primed numerals. However, the output coupling 20 is mounted on the end of the second shaft 24 in an orientation in which it is rotated ninety degrees with respect to the orientation of the input coupling 12. That is, the axes of the two pins 32 and 32' in the input and output couplings 12 and 20, respectively, are orthogonal to one another. Similarly, the orientation of the two rollers 36' and 38' in the output coupling 20 are rotated ninety degrees with respect to the two rollers 36 and 38 of the input coupling 12.

Figure 2:
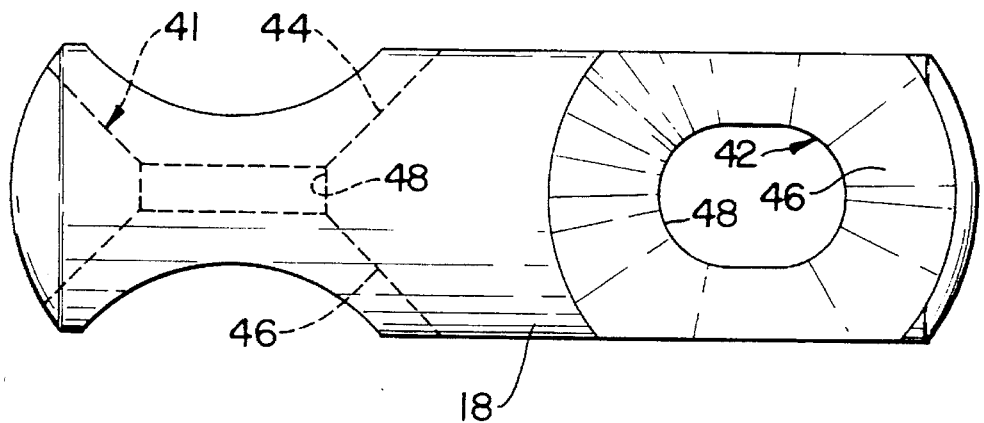
FIG. 2 is a plane view of a link used in the universal joint.

A link 18 extends between the input and output couplings 12 and 20 to provide a mechanical connection therebetween and is shown in detail in FIG. 2. The link 18 is a round cross section bar with rounded ends. Two apertures 41 and 42 are cut through the link 18 near its opposite ends. The axis of the first aperture 41 is ninety degrees around the link from the axis of the second aperture 42. The two apertures 41 and 42 are otherwise identical. Each aperture has oval cross section with the longer dimension of the oval extending along the longitudinal axis of link 18, thus forming a slot to receive the rollers 36 and 38 as will be described. Although an oval cross section is used in the preferred embodiment other geometric shaped apertures may be used. As each end of the aperture 41 or 42 approaches the surface of the link 18, its cross sectional area increases in a tapered fashion to form a countersunk opening 44 and 46, respectively. Thus, the link apertures have conical portions where they open through the surface and have an oval cylindrical intermediate section 48 at their midpoints.

Figure 3:
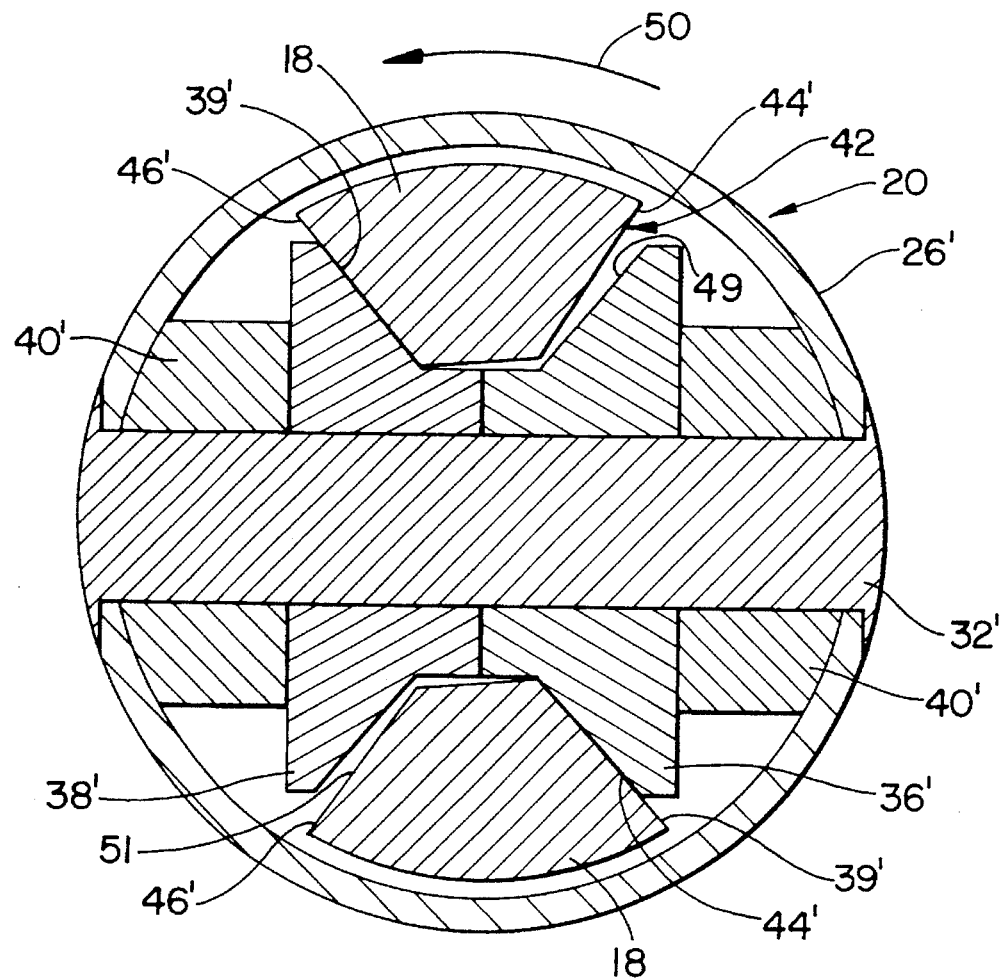
FIG. 3 is a transverse cross-sectional view along line 3—3 in FIG. 1.

With reference to FIGS. 1 and 3, when the link 18 is assembled onto the input and output couplings 12 and 20, the pair of rollers 36 and 38 or 36' and 38' of the respective coupling are received within one of the apertures 41 or 42 of the link. The cross section of the oval shaped intermediate portion 48 of each aperture 41 or 42 is smaller than the larger diameter end of each roller. Thus, the link 18 is captivated between each pair of abutting rollers.

As input coupling 12 is rotated by the first shaft 16, the conical sections 35 and 37 of rollers 36 and 38 press against the tapered portions 44 and 46, respectively, of the first aperture 41 in link 18. This transfers the rotational force to the link causing it to rotate with the input coupling 12. FIG. 3 illustrates in detail how the force is transferred further from the link 18 to the output coupling 20, and in a reverse fashion to the force transfer from input coupling 12 to the link. As the link 18 is rotated in direction 50 it becomes skewed, so that the tapered portion 44' of link aperture 42 presses against the conical middle section 39' of roller 36' on one side of pin 32'. On the other side of pin 32', the opposing tapered portion 46' of the link aperture 42 contacts the conical middle section 39' of the other roller 38'. This produces separate contact areas the two rollers 36' and 38' that are 180 degrees opposite each other. This action transfers the rotational force to the rollers 36' and 38' and then through pin 32' to the body 26' of output coupling 20. If the direction of rotation is reversed, the link pivots so that its upper portion in FIG. 3 contacts roller 36' at region 49 and the lower portion of the link contacts roller 38' at region 51.

As the link 18 continues to rotate in direction 50, the points of contact between the rollers 36' and 38' and the link change causing the rollers to counter rotate. That is, one roller rotates clockwise about pin 32', and the other roller counterclockwise as the link rotates. This counter rotation minimizes the torque exerted upon the pin 32', as compared to when a pin alone is used as the contact surface with the link. The varying points of contact between the rollers and the link also distributes the wear over a region on the surfaces of those components, thus prolonging their life as compared to non rotating components.

The counter rotation of the rollers 36' and 38' is possible because of the elongated aperture 42 and the conical portions 44' and 46' of that aperture allow movement between the link 18 and the output coupling 20 in two orthogonal directions. As illustrated better with respect to the input coupling 18 in FIG. 1, the shape of the aperture 41 and the conical surface 39 of each roller 36 and 38 allows the link 18 to pivot about the axis 52 of the rollers and also allows the link to move up and down in the plane of the drawing. That is, the angle α between the rotational axis 52 of rollers 36 and 38 and the center line 54 of the link aperture 41 can vary as the input coupling 12 rotates. This dual axis movement between the link 18 and each coupling 12 and 20 minimizes the rotational velocity difference between the respective coupling and the link. By employing two identical connections of this type between link 18 and the input and output couplings 12 and 20, the two couplings will rotate at the same velocity or nearly the same velocity at all angular positions. This uniformity of velocity reduces the vibration produced in other universal joints which had greater velocity deviation with angular position.

The movement in two orthogonal axes provides full 360 degrees angular operation with minimal clearances for the universal joint and minimal vibration. This makes the present universal joint particularly useful in very small devices that develop high rotational speeds, for example surgical drills rotating at 80,000 RPM.

It will be apparent to those skilled in the art that the present inventive concept can be incorporated into other embodiments of a universal joint. For example, the link may be a tube with a pair of rollers near each end. In this alternative embodiment, the input and output couplings have an aperture similar to aperture 41 in which a pair of rollers is received.

We claim:

1. A universal joint comprising:

link having a first and second apertures therethrough wherein each aperture tapers so that a cross sectional area of each aperture decreases with increasing distance from a surface of said link;

a first body having a first mechanism for connecting a first shaft thereto;

a first roller having a longitudinal axis and a conical surface wherein a diameter of the first roller decreases going along the longitudinal axis toward one end of said first roller;

a second roller having a longitudinal axis and a conical surface wherein a diameter of said second roller decreases going along the longitudinal axis toward one end of said second roller;

a first pin attached to said first body and extending through the first aperture in said link, and extending through said first and second rollers with the one end of said first roller adjacent the one end of said second roller;

a second body having a second mechanism for connecting a second shaft thereto;

a third roller having a longitudinal axis and a conical surface wherein a diameter of the third roller decreases going along the longitudinal axis toward one end of said third roller;

a fourth roller having a longitudinal axis and a conical surface wherein a diameter of said fourth roller decreases going along the longitudinal axis toward one end of said fourth roller; and a second pin attached to said second body and extending through the second aperture in said link, and extending through said third and fourth rollers with the one end of said third roller adjacent the one end of said fourth roller.

2. The universal joint as recited in claim 1 further comprising:

first and second sleeves on said first pin with the first sleeve on one side of said first and second rollers and the second sleeve on an opposite side of said first and second rollers; and third and fourth sleeves on said second pin with the third sleeve on one side of said third and fourth rollers and the fourth sleeve on an opposite side of said third and fourth rollers.

3. The universal joint as recited in claim 1 wherein said first body comprises a cylindrical member having the first mechanism at one end and a first cavity extending into the member from an opposite end with said first pin and said first and second rollers located in the first cavity.

4. The universal joint as recited in claim 3 wherein second body comprises another cylindrical member having the second mechanism at one end and a second cavity at an opposite end with said second pin and said third and fourth rollers located in the second cavity, 5. The universal joint as recited in claim 4 wherein the first and second mechanisms comprise threaded apertures in said first and second bodies.

6. A universal joint comprising:

a first body for connecting to a first rotating member;

a second body for connecting to a second rotating member;

a link;

a first coupling mechanism for connecting said first body to said link and including a first pair of rollers with conical surfaces and rotatably attached to one of said first body and said link, and a first aperture in the other one of said first body and said link, wherein the first pair of rollers is received in the first aperture; and a second coupling mechanism for connecting said second body to said link and including a second pair of rollers with conical surfaces and rotatably attached to one of said second body and said link, and a second aperture in the other one of said second body and said link, wherein said second pair of rollers is received in the second aperture.

7. The universal joint as recited in claim 6 wherein the first aperture tapers so that a cross sectional area of the first aperture decreases with increasing distance from a surface of said link, and the second aperture tapers so that a cross sectional area of the second aperture decreases with increasing distance from a surface of said link.

8. A universal joint comprising:

a link having a first aperture therethrough;

a first body for connecting to a first rotating member;

a first pin attached to said first body; and a first pair of rollers rotationally mounted adjacent each other on said first pin, with said first pin and said first pair of rollers extending into the first aperture of said link, wherein each roller of said first pair of rollers has a conical surface which is engaged by said link wherein the first pair of rollers rotate simultaneously in opposite directions as said first body rotates.

9. A universal joint comprising:

a link having a first aperture and a second aperture therethrough;

a first body for connecting to a first rotating member;

a first pin attached to said first body; and a first pair of rollers rotationally mounted adjacent each other on said first pin, with said first pin and said first pair of rollers extending into the first aperture of said link;

a second body for connecting to a second rotating member;

a second pin attached to said second body; and a second pair of rollers rotationally mounted adjacent each other on said second pin, with said second pin and said second pair of rollers extending into the second aperture of said link, wherein each roller of said first pair of rollers and said second pair of rollers has a conical surface which is engaged by said link, wherein, as said first body rotates, said rollers in said first pair of rollers rotate simultaneously in opposite directions and said rollers in said second pair of rollers rotate simultaneously in opposite directions.

10. A universal joint comprising:

a link having a first aperture therethrough;

a first body for connecting to a first rotating member;

a first pin attached to said first body; and a first pair of rollers rotationally mounted adjacent each other on said first pin, with said first pin and said first pair of rollers extending into the first aperture of said link, wherein the first aperture tapers so that a cross sectional area of the first aperture decreases with increasing distance from a surface of said link.

11. A universal joint comprising:

a link having a first aperture and a second aperture therethrough;

a first body for connecting to a first rotating member;

a first pin attached to said first body; and a first pair of rollers rotationally mounted adjacent each other on said first pin, with said first pin and said first pair of rollers extending into the first aperture of said link, wherein the first aperture tapers so that a cross sectional area of the first aperture decreases with increasing distance from a surface of said link, and the second aperture tapers so that a cross sectional area of the second aperture decreases with increasing distance from a surface of said link.

* * * * *